United States Patent [19]

Akamatsu

[11] 4,146,921
[45] Mar. 27, 1979

[54] POWER CONTROL OR CONVERSION APPARATUS

[75] Inventor: Masahiko Akamatsu, Amagasaki, Japan

[73] Assignee: Mitsubishi Denki Kabushiki Kaisha, Tokyo, Japan

[21] Appl. No.: 816,708

[22] Filed: Jul. 18, 1977

[30] Foreign Application Priority Data

Jul. 27, 1976 [JP] Japan .................................. 51-89786
May 27, 1977 [JP] Japan .................................. 52-62361

[51] Int. Cl.² ........................................ H02M 7/515
[52] U.S. Cl. ...................................... 363/138; 363/96
[58] Field of Search .................. 363/136, 137, 138, 96

[56] References Cited

U.S. PATENT DOCUMENTS

| | | | |
|---|---|---|---|
| 3,074,030 | 1/1963 | Hierholzer, Jr. ................ | 363/136 X |
| 3,219,905 | 11/1965 | Davis et al. .......................... | 363/138 |
| 3,469,169 | 9/1969 | Schlabach et al. .................... | 363/138 |
| 3,474,322 | 10/1969 | King .................................. | 363/137 X |
| 3,504,266 | 3/1970 | Schlabach et al. .................... | 363/138 |
| 3,555,397 | 1/1971 | Frank ................................ | 363/138 |
| 3,622,863 | 11/1971 | King .................................. | 363/137 X |
| 3,848,176 | 11/1974 | Etter ................................. | 363/96 |

FOREIGN PATENT DOCUMENTS 301801  4/1971  U.S.S.R. ............................ 363/138

*Primary Examiner*—William M. Shoop
*Attorney, Agent, or Firm*—Oblon, Fisher, Spivak, McClelland & Maier

[57] ABSTRACT

A power control or conversion apparatus comprises a combination of a controlled electric valve bridge and an electric valve bridge being coupled to each other in anti-parallel combination; DC reactors inserted in series in positive and negative electric paths coupling the controlled electric valve bridge with the electric valve bridge in anti-parallel combination; extension means for reverse-biasing the controlled electric valves of the controlled electric valve bridge to extinguish them; and switching means inserted in the coupling portion between the respective electric valve bridges and a DC power source. The extinction means and the DC reactors cooperate to forcibly commutate the controlled electric valve. The DC reactors also make current smooth.

15 Claims, 22 Drawing Figures

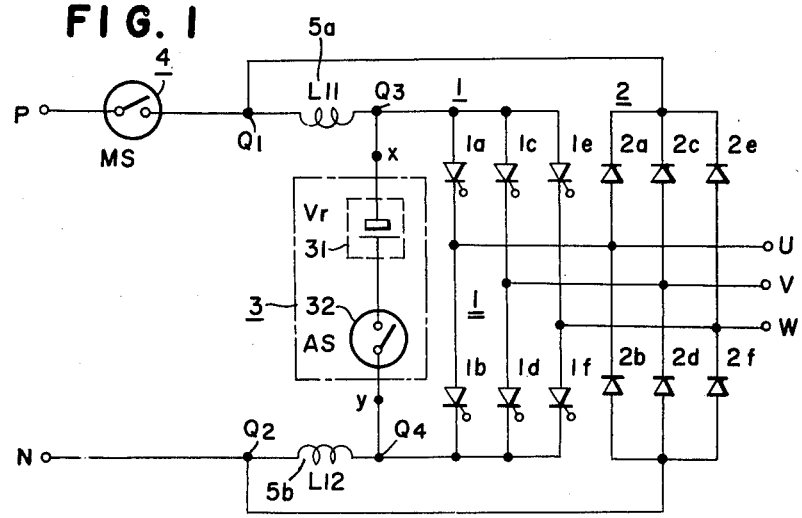
FIG. 1
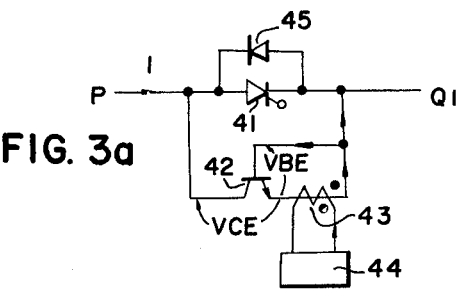
FIG. 3a
FIG. 3b
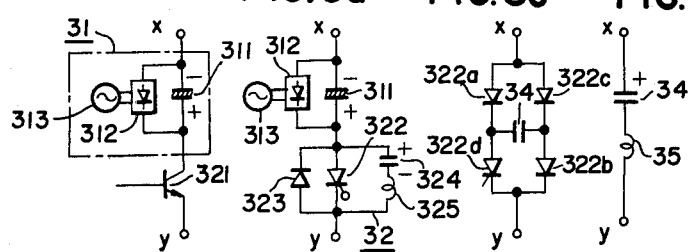
FIG. 3c  FIG. 3d  FIG. 3e  FIG. 3f

POWER CONTROL OR CONVERSION APPARATUS

BACKGROUND OF THE INVENTION

The present invention relates to a forcible commutation type power control or conversion apparatus using controlled electric valve.

In inverters or DC power controllers, it is common to switch at least one pair of controlled rectifier elements connected in series-parallel combination (bridge or half-bridge connection). Diverse methods for commutating such connected components have been known, with one of the prior arts close to the invention being Japanese Patent Publication No. 24447/'67. In the prior art, the controlled rectifier bridge (controlled electric valve bridge) and the rectifier bridge (electric valve bridge) are direct-coupled in anti-parallel combination. A reverse bias impulse current is applied to both the bridges thereby to simultaneously turn off the controlled rectifier element. This method is defective in that the rise rate (turn-off dv/dt) of the reapplied forward voltage immediately after the extinction, is remarkably high. Furthermore, the reverse bias impulse current flows into a plurality of rectifier elements branches. The reduction of the forward currents to be commutated of the controlled rectifier elements to be turned off, is considerably impeded by the wiring inductances or anode reactors (for example, reactors for restricting the turn-on di/dt or saturable reactors for restricting dv/dt). In other words, the commutation or reverse biasing are difficult. Particularly in the case of large current units, a slight wiring inductance considerably increases the desired commutation impulse current.

In the light of the just-mentioned disadvantages of the prior art apparatus, the present invention has an object to provide an AC power supply apparatus of easy-switching forced commutation type, having a current-source like output characteristic.

SUMMARY OF THE INVENTION

Accordingly, there is provided a power control or conversion apparatus which comprises a combination of a controlled electric valve bridge and an electric valve bridge being coupled to each other in anti-parallel combination; DC reactors inserted in series in positive and negative electric paths coupling the controlled electric valve bridge with the electric valve bridge in anti-parallel combination; extinction means for reverse-biasing the controlled electric valves of the controlled electric valve bridge to extinguish them; and switching means inserted in the coupling portion between the respective electric valve bridges and a DC power source. The extinction means and the DC reactors cooperate to forcibly commutate the controlled electric valve. The DC reactors also smooth current.

BRIEF DESCRIPTION OF THE DRAWINGS

FIG. 1 shows a circuit diagram of a basic embodiment of the invention;

FIG. 3 shows partial connection of component circuits of the invention;

FIGS. 7 and 8 show still other embodiments of the invention;

DESCRIPTION OF THE PREFERRED EMBODIMENTS

Figure 2A:
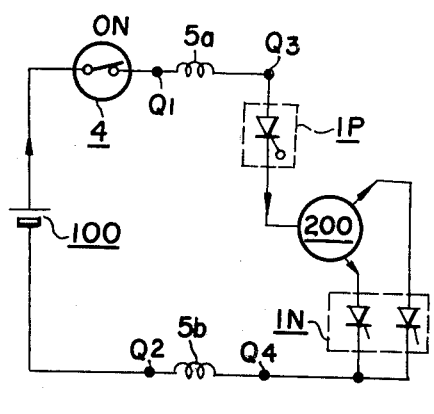
FIGS. 2 (a) to (e) show circuit modes for illustrating the operation of the apparatus of the invention.

FIG. 1 shows a circuit diagram of an embodiment of the invention. The embodiment comprises a plurality of series combinations which consist of a pair of controlled rectifier elements (hereinafter referred merely to as a thyristor bridge) (1), a plurality of series combinations consist of a pair of rectifier elements (hereinafter referred merely to as a diode bridge) (2), a first inductor (5a), a second inductor (5b), an inverse bias means (3) having a reverse bias power source (31) and an auxiliary solid state switch (32), and a solid state switch (4). The series connection points of both the bridges are connected to each other and constitute intermittent potential output terminals U, V and W (corresponding to AC output terminals of an inverter). DC input terminals P and N are connected a DC power source (not shown). A not shown load may be connected across any combination of these terminals U, V, W, P and N. The load may also be connected across the terminals of any combination of the intermittent potential terminals or the non-intermittent potential terminals of other similar apparatuses not shown here. Variation of the combination of the terminals connected with the load, enable the transmission and reception of AC power or DC power and the supply of various pulse powers.

Some typical circuit condition diagrams (circuit modes) for illustrating some typical operations of the FIG. 1 embodiment, are shown in FIG. 2. Variations of the combination of component conditions make many other modes of circuit than the illustrated circuit conditions.

Figure 2B:
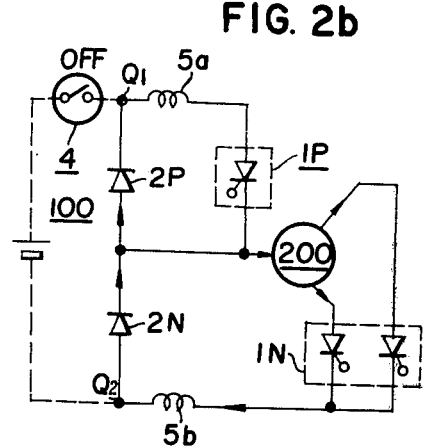

FIG. 2(a) shows a typical power supply mode forming a loop passing through a path of a DC power source (100)-solid state switch (4)-first inductor (5a)-any (1P) of positive side controlled rectifier elements (1P)-load (200)-any of negative side controlled rectifier elements (1N)-second inductor (5b). FIG. 2(b) shows a typical circuit condition of a free loop current mode (zero voltage mode), with OFF state of the solid state switch (4). At this time, corresponding to the active load lines, a proper positive rectifier elements or elements 2P and a negative rectifier element or elements 2N are conductive so that the first and second inductors (5a) and (5b), and the controlled rectifier elements now being conductive in the above mode (1P) and (1N), cooperate to form a single or multiple short-circuited loops. In this free loop current mode, the voltage between the first and second nodes Q₁ and Q₂ is nearly zero. Therefore, the repetition of the ON-OFF operation of the solid-state switch (4) repeats the alternation of the power supply mode and the free loop current mode. As a result, it is possible to control the time average voltage and the time average current.

Figure 2C:
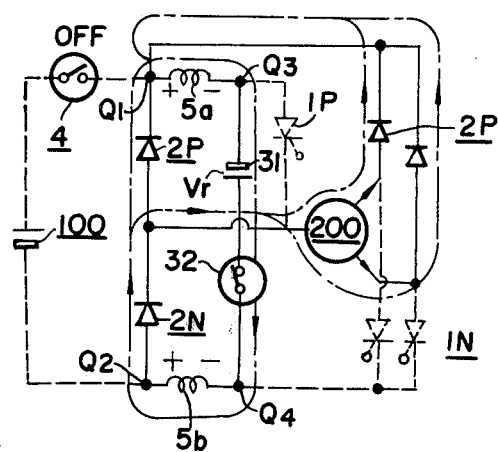

In order to execute extinction before the controlled rectifier elements to be conductive are switched, a reverse voltage is applied between the third and fourth nodes Q₃ and Q₄, i.e. across the thyristor bridge (1), by means of reverse bias means (3) during the time the solid state switch (4) is turned off, or the solid state switch (4) is turned off. The reverse bias mode is illustrated in FIG. 2(c). As shown in the Figure, the voltage V_r of the reverse power source (31) is applied between the third and fourth nodes Q$_3$ and Q$_4$. This mode forms a loop (3)-(5b)-(2N)(2P)-(5a)-(3), with the result that the reverse voltage V$_r$ is dividedly applied to the first and second inductors (5a) and (5b). When it is desired to turn off only the positive side controlled rectifier element (1P), the reverse voltage is impressed between the third and second nodes Q$_3$ and Q$_2$ or the reverse bias means (3) is connected between the nodes Q$_3$ and Q$_2$. Similarly, when it is desired to turn off only the negative side controlled rectifier element (1N), the reverse bias voltage is applied between the first and fourth nodes Q$_1$ and Q$_4$.

In the FIG. 1 embodiment, the reverse bias voltage is impressed between the third and fourth nodes and +-signed voltages shown in FIG. 2(c) indicating that the reverse bias voltage is divided by the first and second inductors (5a) and (5b), are applied to the controlled rectifier elements. More specifically, the positive controlled rectifier element (1P) indicated by dotted line receives, as the reverse voltage, the difference voltage between the voltage across the second inductor (5b) and the reverse voltage V$_r$, i.e. the voltage equal to that across the first inductor (5a), through the loop (31)-(32)-(5b)-(2n)-(1P)-(3). On the other hand, the negative side controlled rectifier element (1N) receives as the reverse voltage the difference between the reverse voltage V$_r$ and the voltage across the first inductor (5a), i.e. the voltage equal to that across the second inductor (5b). In the reverse bias mode, the load current flows through the loop dotted of (5a)-(31)-(32)-(5b)-(2N)-(200)-(2P)-(5a), and a small current which increases by applying voltage to both the inductors flows through the loop of (5a)-(31)-(32)-(5b)-(2N)-(2P)-(5a).

Through the above-mentioned reverse bias mode, any of the controlled rectifier elements is turned off and again turned on, thus permitting the circuit to transfer to the power supply mode or the free loop current mode conducted through other elements.

Figure 2D:
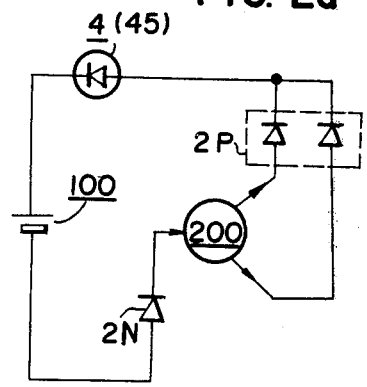
Figure 2E:
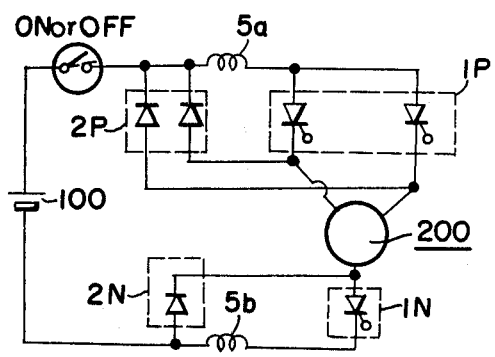

FIG. 2(d) shows a typical power regenerative mode in which the power is regenerated through a loop of load (200)-rectifier element (2P)-reverse direction of solid state switch (4)-power source (100)-rectifier element (2N). In this mode, the reverse direction of the solid state switch may be a rectifier element (45) bearing reverse current provided in the solid-state switch.

In the case where the load has a plurality of branches (for example, multiphase load), in fact, a partial load to be power-supplied, another partial load to be regenerated and still another partial load permitting loop current concurrently exist.

The basic circuit conditions mentioned above may be modified variously. A desired power control or conversion may be attained by a proper switching among these conditions. Inverters, power amplifiers, DC power control apparatuses and the like are some typical applications of these.

FIG. 3 shows exemplars of component circuits of the invention, and (e), (a) and (b) are examples of the solid state switch (4), respectively, in which the example (e) may be used for reverse bias means. The example (a) comprises a thyristor (41) and a diode (45) connected with the former in anti-parallel combination. The reverse conductive thyristor or the bidirectional thyristor may be substituted for the diode and thyristor combination. The thyristor (41) is turned off or extinguished by an extinction commutating means including a transistor (42), a pulse current transformer (a pulse transformer) (43) and a power pulse generator (44). The power pulse generator (44) feeds pulse current to the pulse transformer (43). An example of the pulse generator is comprised of a pulse charging/discharging means including thyristor and capacitor, a DC power source and a transistor switch. The secondary current of the pulse transformer (43) is current-multiplied (voltage-dropped) to render the transistor (42) conductive in the emitter-base path and, then, in the collector-emitter. At this time, the load current passing through a P-Q$_1$ path flows into the transistor (42) and the difference between the base-emitter voltage V$_{BE}$ and the collector-emitter voltage V$_{CE}$ (V$_{BE}$-V$_{CE}$) serves as the reverse voltage for the thyristor (41). Here, V$_{BE}$ > V$_{CE}$. Such a transistor permitting only the pulse conduction may easily be adapted for high current and voltage treating circuit, as compared with the constantly conductive transistor of current amplifying type.

The (b) of the figure shows a thyristor chopper including a commutation capacitor (49), a commutation reactor (46), and auxiliary switches (47) and (48). These auxiliary switches (47) and (48) may be substituted by suitable other components such as reverse conduction thyristors.

The (e) of the figure shows a thyristor chopper in which a commutation capacitor (34) between the alternate current terminals of a thyristor bridge including thyristors (322a) to (322d). The main current is made to flow through a first through path including thyristors (322a) and (322d) and a second through path including thyristors (322c) and (322b), these paths being alternately made conductive. In extinction, when one of the through paths is conductive, one of the thyristors in the other through path is fired and the capacitor voltage charged at this time reversely biases one of thyristors in the conductive through path. In other words, the chopper is operated through the alternate extinguishing operation by using the commutation of the bridge inverter and through the alternate formation of the through paths.

In the example of a reverse bias means (3) shown in FIGS. 3 (c), (d), (e) and (f), (c) shows the case where a reverse bias power (31) is inserted in series with an auxiliary solid state switch (321) (for example, transistor, thyristor chopper, gate turn-off thyristor or the like). The reverse power source (31) may be comprised of, for example, a capacitor (311), a rectifier (312) and an AC power source (313). The figure (d) employs, as the auxiliary solid-state switch (321) in the FIG. 3(c) case, a thyristor chopper (32) comprising a rectifier (323), a thyristor (322), a capacitor (324), and a reactor (325). The figure (e) shows the case to produce a reverse bias voltage between the terminals x and y to make alternately conductive a first pair of arms (322a) and (322b) and a second pair of arms (322c) and (322d) by using a capacitor (34) and a thyristor bridge including thyristors (322a) to (322d). The figure (f) case comprises a C-L series circuit including a capacitor (34) and a reactor (35). The C-L series circuit is connected between the third and fourth nodes Q$_3$ and Q$_4$ shown in FIG. 1. When the main solid state switch (4) is conductive, the capacitor (34) is charged with the polarity as shown in FIG. 3(f). Before the series group (1) of the controlled rectifier elements is extinguished, its DC terminals (the third and fourth nodes Q$_3$ and Q$_4$) are short-circuited. The short-circuiting is made by firing any or all of the series portions of thyristors (1a) and (1b), (1c) and (1d), or (1e) and (1f). By the short-circuiting, the capacitor (34) is discharged and, through action of the inductor (35) (the inductor of wire may also be available), it is recharged with the polarity opposite to that shown in the figure. This opposite polarity charged voltage reversely biases the entirety of the thyristor bridge (1).

As described above, in the heretofore described embodiment of the invention, the voltage of the main DC power source (100) is not directly applied to the first and second inductors (5a) and (5b) during the reverse bias period of the main thyristor (1) (the mode of FIG. 2(c)). The voltage applied thereto is the low reverse bias voltage $V_r$, so that energy stored in the inductors is small. The reverse bias means (3) is provided with the commutation capacitor (34). In case where this is used as a reverse bias voltage source, the commutation capacitor (34) is connected at the reverse bias power source (31) in the reverse bias mode shown in FIG. 2(c). In this case, the commutation capacitor (30) discharges through a loop including (5b)-(2N)-(2P)-(5a) and then it is recharged with opposite polarity. During the time, the current flowing in the first and second inductors (5a) and (5b) temporarily increases, however, it decreases when the capacitor is recharged with opposite polarity. When the currents of this inductor returns to the initial value, the capacitor (34) is charged to have a voltage of which the absolute value is equal to the initial value but the polarity is opposite to that. In other words, the stored energy of the inductors (5a), (5b) is not increased but the polarity of it becomes merely opposite. The residual current substantially equal to the initial current of the inductor charges supplementarily the capacitor (34) in order to compensate for the loss found in the charging/discharging process. Alternately, the residual current of inductor flows through the thyristor newly fired and the rectifier element. The loop through which this current flows is designated by (1P)-(2P)-(5a) or (1N)-(5b)-(2N) in FIG. 2(e). When the current of the inductor (5) coincides with that of the load (200), the circuit mode becomes that corresponding to the FIG. 2(d) or (a). As described above, the apparatus of the invention suffers from little commutation loss because of no accumulation or storing function of energy. When the commutation capacitor (34) is used, in the reverse bias mode in FIG. 2(c), the thyristor voltage gradually increases toward the forward voltage as the capacitor is reversely charged. The thyristor bridge (1) increases its voltage toward the forward voltage in parallel connection circuit mode with the capacitor (34), with a common terminal of the third and fourth nodes Q3 and Q4. Therefore, the voltage rise ratio dv/dt immediately after the turn-off is low, thus resulting in lessened turn-off load of the thyristors.

Furthermore, if the commutation should fall, since the first and second inductors (5a) and (5b) are inserted in series in the short-circuited loop including thyristors, the short-circuiting current is restricted, ensuring the protection of the apparatus.

Figure 4A:
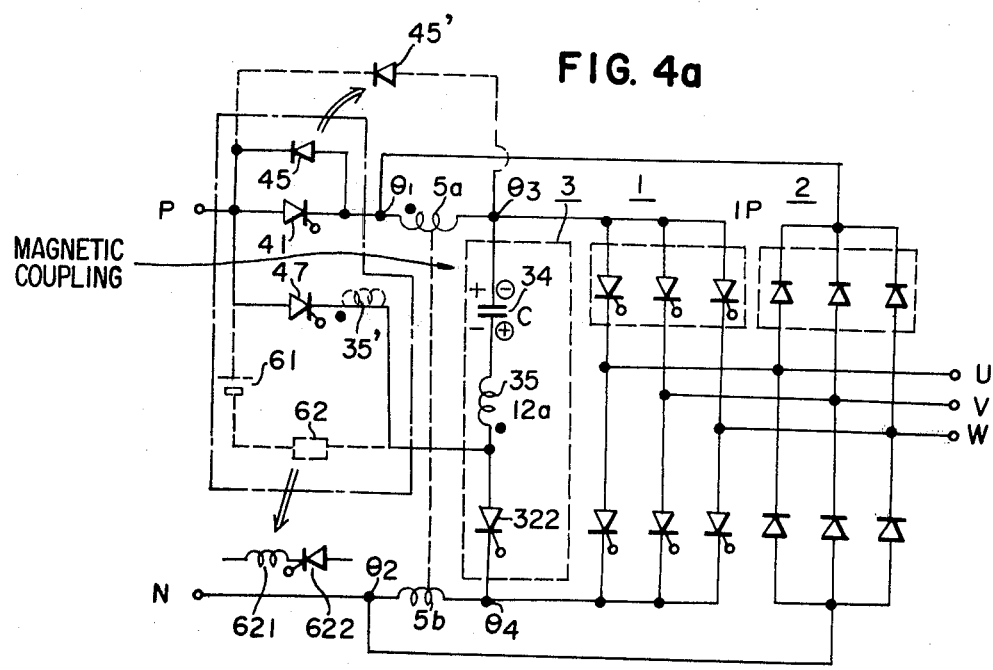
FIGS. 4 through 7 show circuit diagrams of other embodiments of the invention.

FIG. 4(a) shows a circuit diagram of another embodiment of the invention. In the example, a thyristor chopper is used in place of the solid state switch in FIG. 1. A capacitor is commonly used for both the commutation capacitor of the thyristor chopper and the commutation capacitor (34) of the reverse bias means (3) of the thyristor bridge (1). In the figure, the capacitor (34) is charged with the polarity as shown in the figure. The charge is made through the route of P-(41)-(5a)-(34)-(35)-(322)-(5b)-N or (61)-(41)-(5a)-(34)-(35)-Rc-Ec. Reference numerals designates auxiliary charging means which are depicted by dotted line. The charging means ensures a satisfactory capacitor charging voltage when the main power source (100) (not shown) supplies a low voltage. Reference numeral (62), i.e. one of the auxiliary charging means, is a series circuit including a resistor Rc or a reactor (621) and an auxiliary thyristor (622), for example, a thyristor, or a series circuit including the reactor (621) and a rectifier element.

In order to extinguish the main thristor (41) of the chopper (4), the auxiliary switch (47) is made conductive to reversely bias the thyristor (41) through a chopper reverse-bias loop (47)-(35)-(34)-(1P)-(2P)-(41)-(45)-(47). The capacitor (34) is reversely charged with ⊕ ⊖ polarity as shown in the figure, through the reverse-bias loop. The reverse charge is made through the L-C resonance with the inductance (35) in the above loop. The inductance (35) may be inserted in any of the branches of the chopper reverse bias loop.

In order to extinguish the thyristor bridge (1), the chopper (4) is rendered OFF to in turn make conductive the auxiliary solid state switch (322). As a result, the capacitor (34) is charged and discharged through the loop (34)-(35)-(322)-(5b)-(2)-(5a)-(34). During this time, the thyristor bridge (1) is reversely biased through the loop (34)-(35)-(322)-(1)-(34). The voltage applied across the first inductor (5a) reversely biases the positive side thyristor (1P), while the voltage applied across the second inductor (5b) reversely biases the negative side thyristor (1N).

Figure 4B:
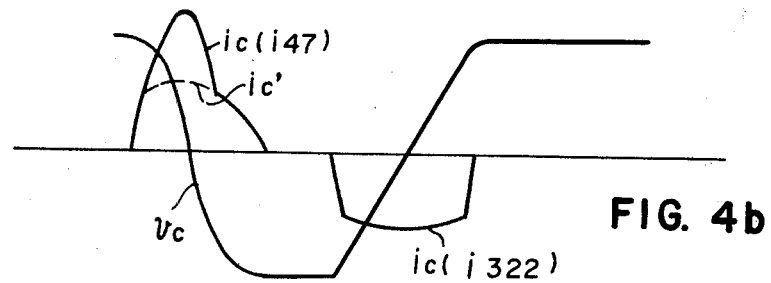

FIG. 4(b) shows waveforms the voltage $V_C$ of the capacitor (34), the capacitor current $i_C$, and further the current $i_{47}$ of the auxiliary solid state switch (322), in the above-mentioned commutation operation.

In FIG. 4, the antiparalleled diode (45) may be connected at the position (45') as indicated by the dotted line. In this case, if the inductor (35) (or (35') indicated by dotted line) is magnetically coupled with the first inductor (5a), the chopper main thyristor (41) may be reversely biased by the voltage pulse. More precisely, the ± polarity voltage of the capacitor (34) is applied to the inductor (35) or (35') through the loop of (47)-(35) or (35')-(34)-(45'). At the same time, the voltage induced across the second inductor (5a) (in the figure, the black dot indicates positive) biases reversely the main thyristor (41). At this time, the current wave forms of the capacitor (34) and of the auxiliary thyristor (47) are restricted in the crest value as shown by the dotted wave ic' in FIG. 4(b).

In short, the FIG. 4 embodiment is advantageous in that a common commutation is employed.

Figure 5:
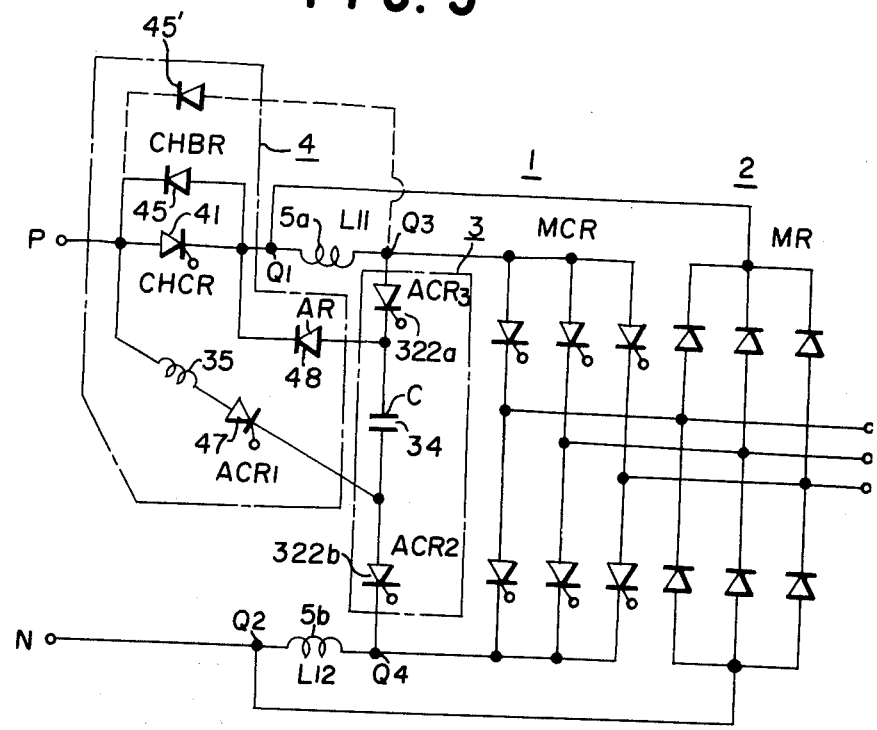

FIG. 5 shows another embodiment of the invention which is a modification of the FIG. 4 embodiment. An auxiliary solid state switch (322a) and an auxiliary rectifier element (48) are additionally used. A loop (47)-(34)-(48)-(41)-(45)-(35)-(47) is used for the reverse bias loop of the chopper. With such a construction, the thyristor (41) for chopper is directly reverse-biased. The reverse bias of the thyristor bridge (1) is made through a loop (322a)-(34)-(322b)-(5b)-(2)-(5a)-(322a).

In this example of FIG. 5, the connection position of the aniparalleled diode (45) is shifted to the (45') position indicated by dotted line, like the FIG. 4 case. In this case, the inductance (35) may be omitted. Because the reverse bias loop of (47)-(34)-(48)-(41) is blocked by the main thyristor (41), thereby preventing short-circuiting of the loop. The polarity of the charged voltage of the capacitor (34) is changed from the ± marked polarity shown in FIG. 1 to ⊖⊕ marked polarity, through the loop (47)-(34)-(48)-(5a)-(45').

Figure 6:
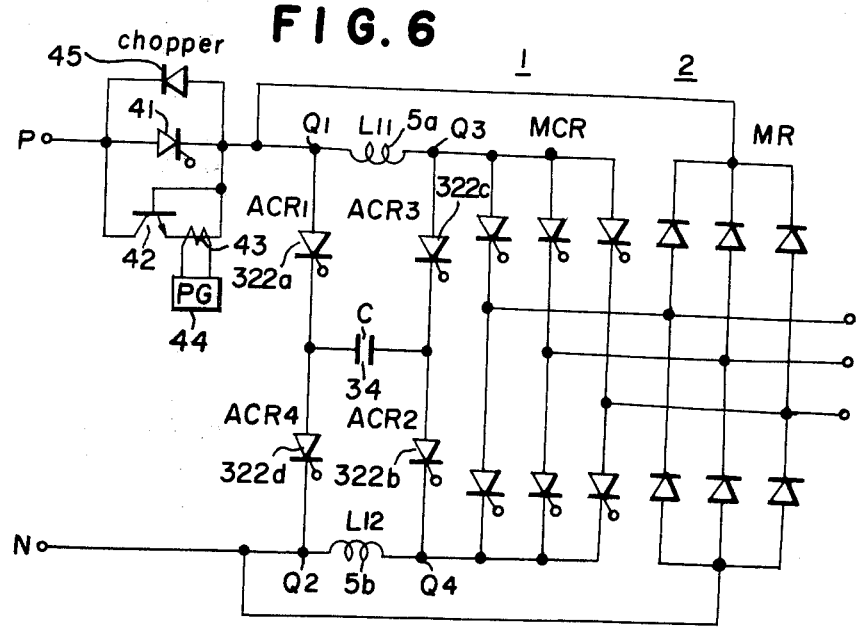

FIG. 6 shows the other embodiment of the invention in which the chopper shown in FIG. 3(a) is used. In this example, the reverse bias means (3) shown in FIGS. 3(c) to (f) may be connected between the third and fourth nodes $Q_3$ and $Q_4$. FIG. 6 shows the case that the reverse bias means in FIG. 3(e) is modified in connection. When the FIG. 3(c) case not modified is used, the reverse bias voltage is applied between the third and fourth nodes $Q_3$ and $Q_4$. In the modified embodiment of FIG. 6, two reverse bias loops are used. One for applying the reverse bias voltage between the first and fourth nodes $Q_1$ and $Q_4$ is $Q_1$-(322a)-(34)-(322b)-$Q_4$-(5b)-(2)-$Q_1$. The other for applying the reverse voltage between the third and second nodes $Q_3$ and $Q_2$, is $Q_3$-(322c)-(34)-(322d)-$Q_2$-(2)-(5a)-$Q_3$. In the former case, the negative side thyristor (1N) is reverse-biased through the loop (322a)-(34)-(322b)-(1N)-(2P)-(322a). In the latter case, the positive side thyristor (1P) is reverse-biased through the loop (322c)-(34)-(322d)-(2N)-(1P)-(322c). The result is that the reverse bias voltage for the thyristor (1) may be set high and that the thyristor (1) may be turned off separately in either one of the positive or negative side thyristor.

Figure 7:
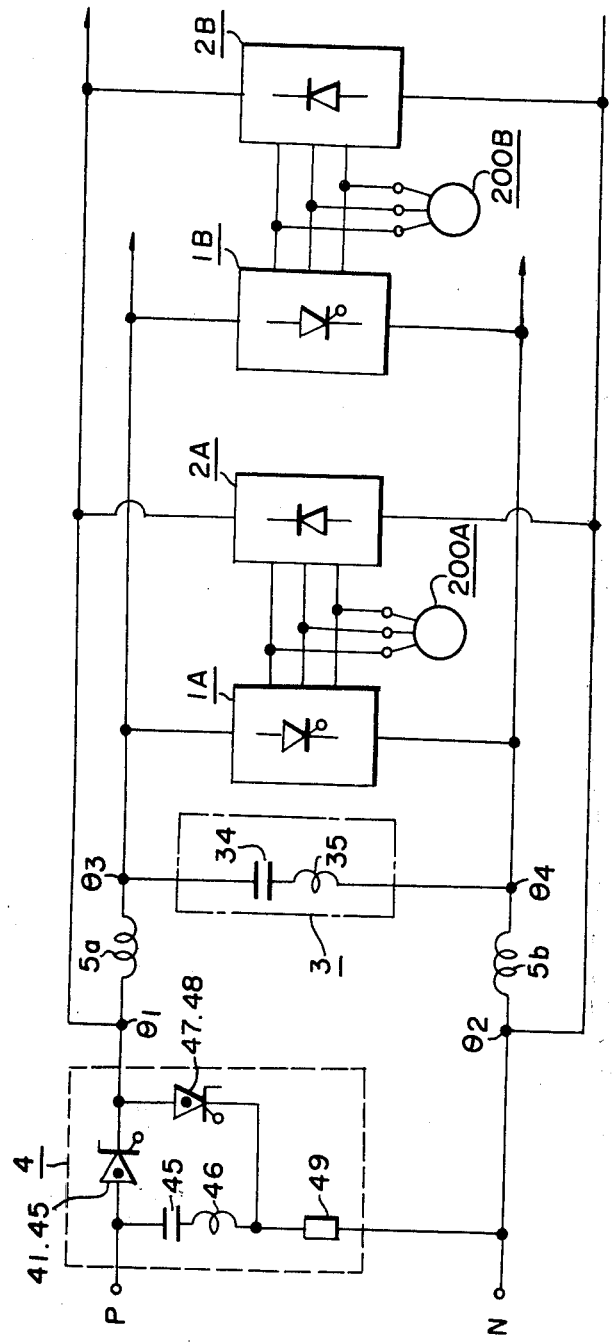

FIG. 7 shows the other embodiment of the invention which is well adapted in design for the power control or conversion apparatus with a plurality of loads (200A) and (200B) and correspondingly with first series groups (1A) and (2A) and second series groups (1B) and (2B). With a single chopper (4) and the first to fourth nodes $Q_1$ to $Q_4$ as common potential terminals, this example may control a plurality of thyristor series groups (1A), (1B), a plurality of rectifier element series groups (2A) and (2B) and a plurality of loads (200A) and (200B). Note here that only two loads and related control circuits are enumerated for control in this example; however, further number of loads and related circuits may be controlled. The loads to be controlled may be AC loads, DC loads, different phase loads or the like. Various kinds loads may be controlled separately in accordance with the respective corresponding features. In this case, only the timings for the reverse bias are common, i.e. the reverse biasing operation is timed concurrently. The turn-on timings (for example, firing angles) of the thyristor groups are controlled in accordance with the respective power supply objects of the corresponding loads.

In the figure, reference numerals (41), (45) and (47), (48) are reverse conductive thyristors and numeral (49) is an auxiliary charging impedance. Various combinations and modifications shown in detail in FIGS. 3 to 6 are possible for the circuit construction of the example, as a matter of fact.

The description to follow is the control method of the apparatus of the invention.

Figure 8:
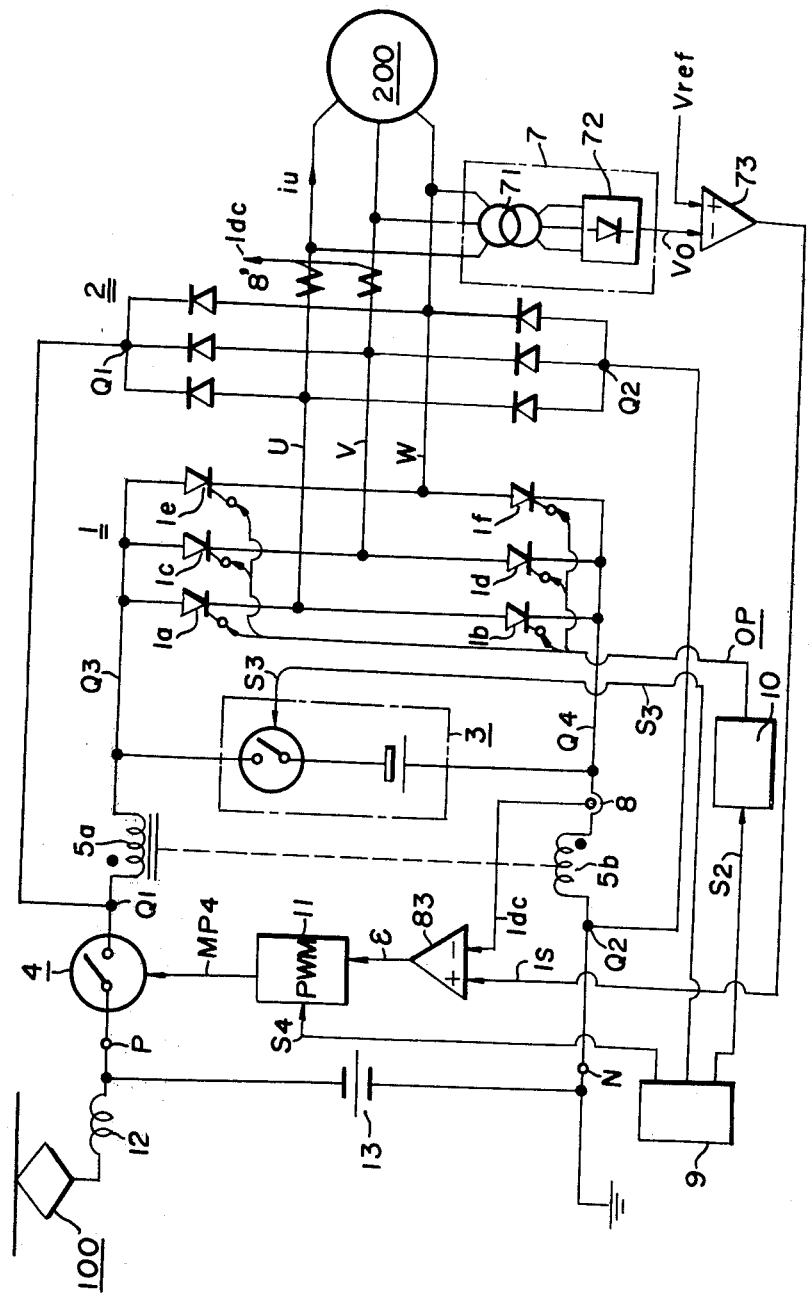
Figure 9:
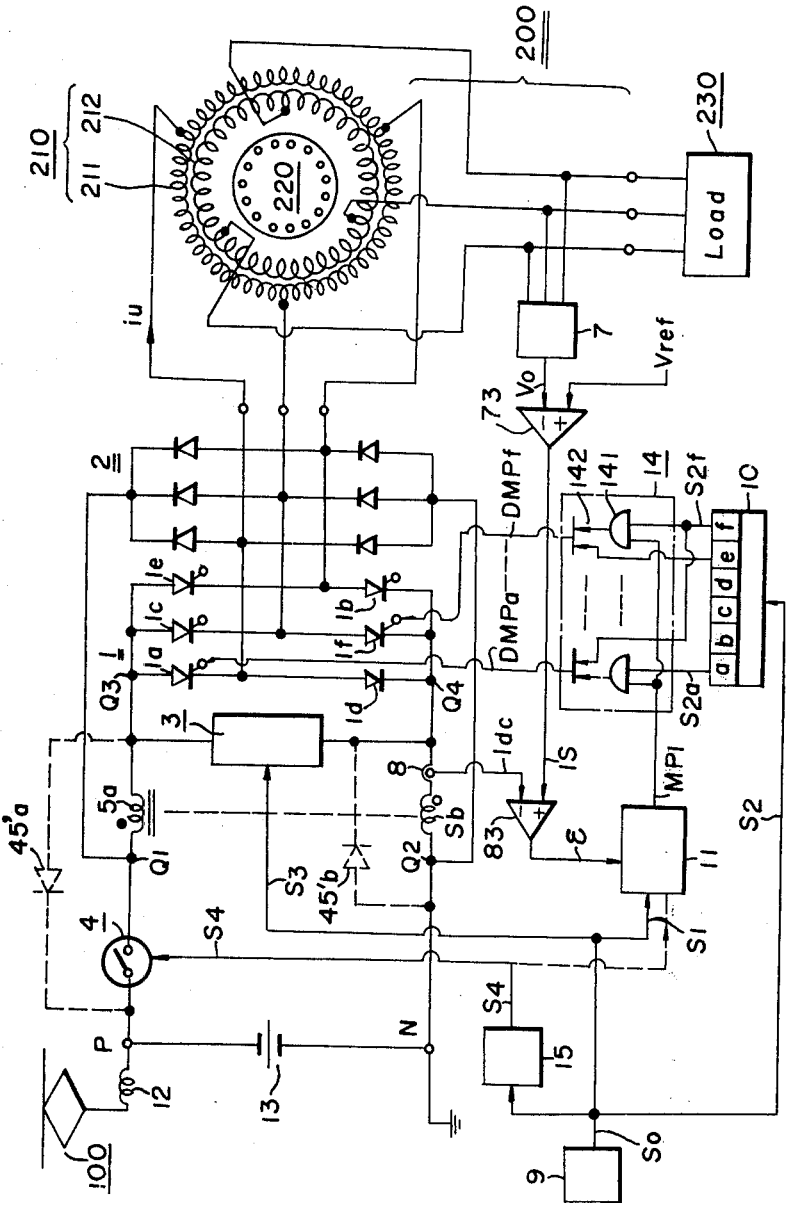

FIGS. 8 and 9 shows a power circuit and a control circuit of embodiments relating to the control of the invention, respectively.

In FIG. 8, an intermittent means (4) is controlled in its conduction by a signal MP$_4$ time-ratio modulated (pulse width modulated). A time ratio control means (11) for generating the signal MP$_4$ is connected to the intermittent means (4). The signal MP$_4$ is synchronized by the fourth synchronizing signal S$_4$ (pulse triangle or sawtooth wave), and its time ratio (pulse width, conduction time ratio of (4)) by an output ε of a comparing (amplifying) means (83). The difference between the output $I_{dc}$ of a current detection means (8) or (8') and the current instruction quantity $I_s$, is fed into the comprising means (83). The current instruction $I_s$ may be an output of a voltage comparing means (73) where an output $V_o$ of a load voltage detecting means (7) and a voltage reference quantity $V_{ref}$ are compared. The load voltage, in this case, may be controlled by treating the control of current as a minor loop. A voltage detecting means (7) may be various other detecting methods than the combination of the transformer (71) and rectifier means (72).

A synchronizing signal generator or variable signal generator (9) generates a synchronizing signal S$_4$, a synchronizing signal S$_2$ for electrical valve group (1), a reverse bias timing signal S$_3$ for the reverse bias means (3). These signals may be commonly used in some cases. The respective electric valves (1a to 1f) of the electric valve group (1) is controlled by outputs DP of a pulse distributing means (conductive signal distributing means) (10). The pulse distributing means (10) is comprised mainly of, for example, ring counter or the like (combination of shift register, ring counter, up/down counter and duder). Such the pulse distributing means fires the respective electric valves, if necessary, by using insulating amplifying means.

FIGS. 10(a) to (d) illustrate a set of timing charts useful in explaining the control scheme described above. In the figure, (a) shows the synchronizing signal S$_2$, (b) the time ratio control signal MP$_4$, (c$_1$) to (C$_6$) conduction control distributing signal DP$_a$ to DP$_f$ for the respective electric valves (1a) to (1f), and (d) the reverse bias pulse generation timing signal S$_3$.

Figure 10:
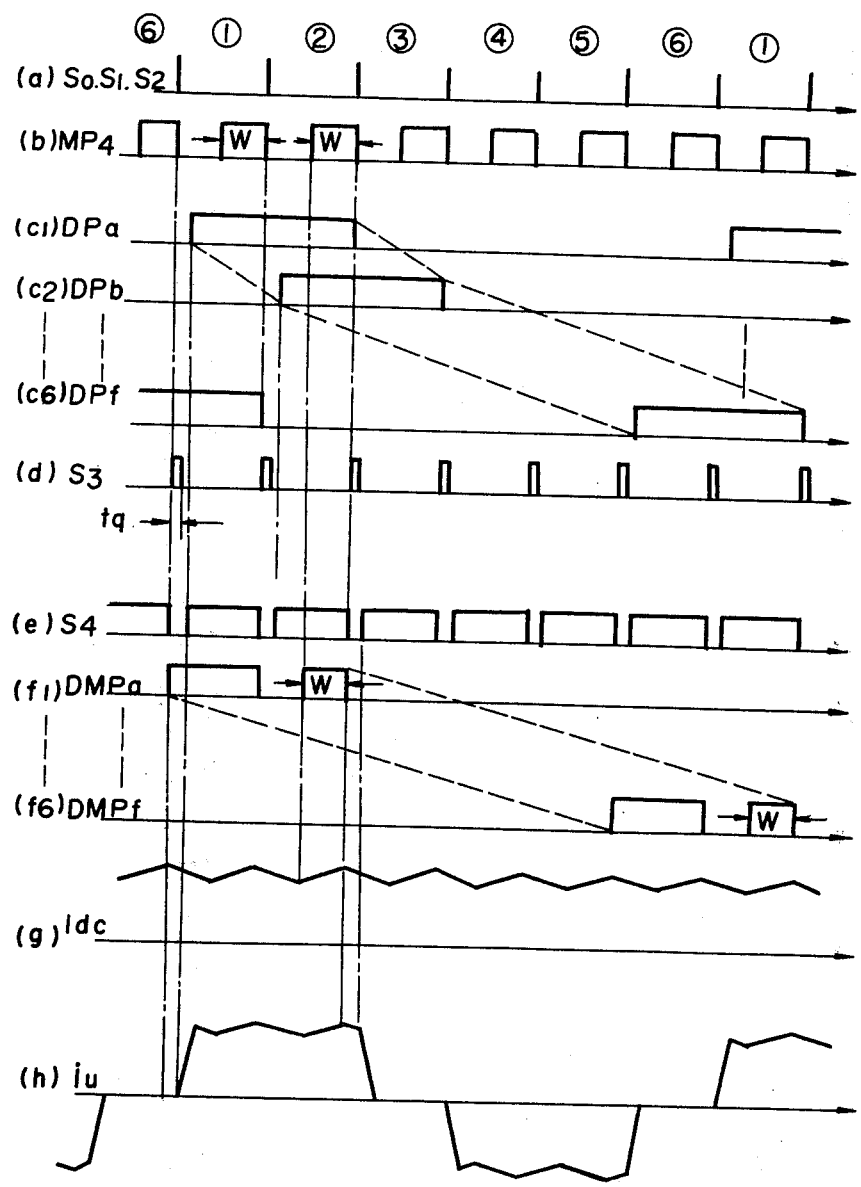
FIG. 10 shows a set of waveforms useful in explaining the operation of the embodiment of the invention.

As a result, in the conduction of the intermittent means (4), the circuit condition becomes as shown in FIG. 2(a), which, in the non-conduction of the (4), the circuit condition becomes as shown in FIG. 2(b). Current $I_{dc}$ of the DC electric path with DC reactors (5a) and (5b) is continuously controlled as shown in FIG. 10(g). The output current (single phase) to an AC load (200) takes almost rectangular wave shapes as shown in FIG. 10(h). That is, the DC reactors (5a) and (5b) serve both to extinguish the electric valve and to smooth the power supply quantity for the conduction time control.

Turning now to FIG. 9, there is shown an embodiment in which the conduction time ratio of the respective electric valves is controlled, unlike the case where the conduction time of the intermittent means (4) is controlled. In this case, rectifier elements (45'a) and (45'b) are coupled with the DC reactors in anti-parallel combination, respectively, or the DC reactors (5a) and (5b) are magnetically coupled to each other. This permits various conditions of electric valves: all of the positive side electric valves are non-conductive; all of the negative side electric valves are non-conductive; or all of the positive and negative sides electric valves are non-conductive.

In FIG. 9, reference numeral (15) designates a signal conversion means for delivering the conduction signal of the intermittent means (4) on the basis of the original synchronizing signal S$_0$. Numeral (14) designates a selection distributing means where the first distributing signals S2$_a$ to S2$_f$ and the conduction time ratio control signal MP$_1$ are composited to produce firing signals DMP$_a$ to DMP$_f$ which are controlled in the conduction time ratio and distributed in a fixed order. The selection distributing means (14) comprises, for example, AND components (4) and OR components (142), and the multiplexer may also be used for the selection distributing means (141). A set of timing charts of the signals in the FIG. 9 embodiment are shown in FIG. 10(a) and (e) to (f). In the figure, (a) indicates the original synchronizing signal $S_0$ and shift pulses $S_2$ directed to the distributing means (10), (e) the conduction signal $S_4$ directed to the intermittent means (4), and ($f_1$) to ($f_6$) the firing signals $DMP_a$ to $DMP_f$ directed to the electric valves ($1_a$) to ($1_f$).

In FIG. 10(b) or ($f_1$) to ($f_2$), reference character W designates the power supply time width by which the amount of power supply is controlled.

In FIGS. 8 and 9, the load (200) may be a rotating machine drive apparatus such as an induction machine or a synchronous machine, and fits for such the machine. In FIG. 9, there is shown another application where (200) is provided with a rotating machine (210) performing transformation and filter-ring, for feeding high harmonics dampled AC power to the load (20). A stator (210) is provided with a stator primary winding (211) and a stator secondary winding (212), constituting a rotating-field generating construction. A rotor (220) is a DC field means (corresponding to the field pole of the synchronous machine) with a cage-rotor or a damper winding.

Figure 11A:
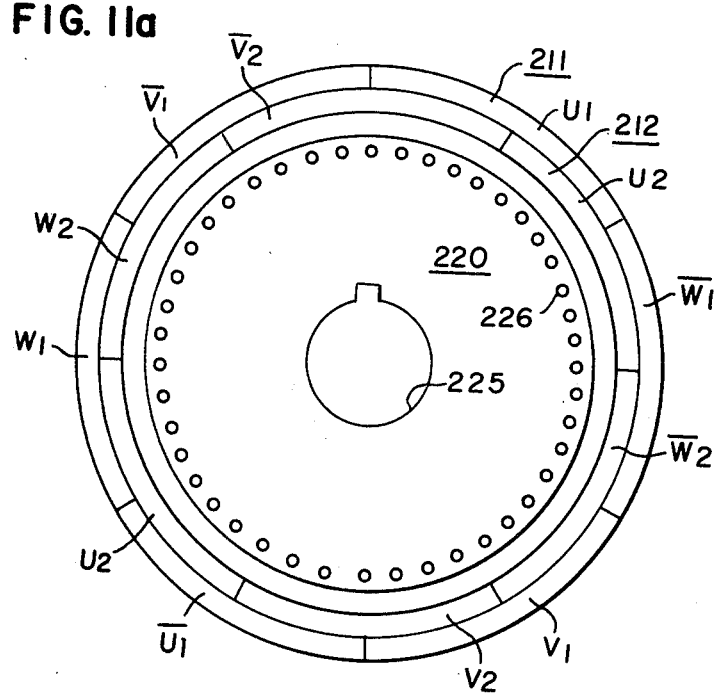
FIG. 11 shows a schematic diagram of a rotary machine.
Figure 11B:
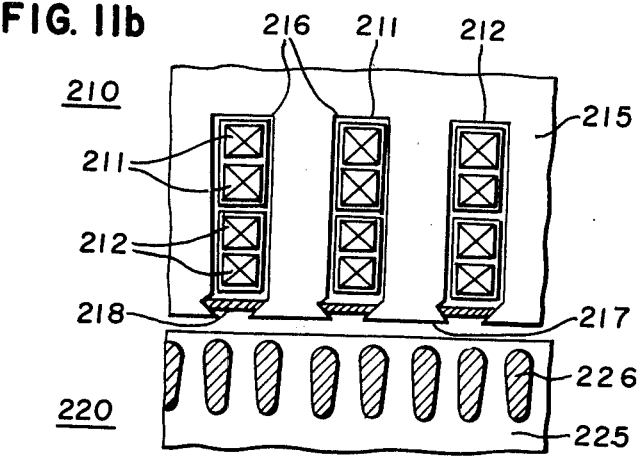

FIG. 11 shows a conceptional construction of the rotating machine, in which (a) shows a distributed region of the conductor cross section (representing double pole rotating machine), and (b) an enlarged cross sectional view of a part of the stator and rotor disposed facing to each other with a gap therebetween. In the (a), the primary and secondary windings (211) and (212) are provided with multi-phase windings distributed, the distributed band of each phase conductor being designated by reference characters ($U_1$, $U_1$)–($W_1$, $W_1$) or ($U_2$, $U_2$)–($W_2$-$W_2$). Reference numeral (226) denotes a cage conductor (damper conductor), (215) a stator pole, (216) stator slots, (217), stator teeth, and (218) wedges.

With the construction shown in FIG. 11, even if the primary current takes the rectangular wave form, the gap flux is smoothed through the action of the cage conductor (high harmonic current is cancelled by the cage conductor current), The result that the magnetomotive force waveform of the secondary winding (212) includes the foundamental wave at a high ratio. In other words, it has little high harmonics. Further, it is possible to execute the transformation of turn ratio between the primary and secondary windings, with insulation function. Thus, this is suitable for a power source apparatus such as a vehicle power source.

As described above, according to the invention, DC reactors are used and electric valves may be turned off by reverse-biasing them during the OFF period of time of the intermittent means. Therefore, the commutation is easily made, and excessive over current is restricted, thus resulting in easy protection of the apparatus related. Further, DC reactors serves also to smooth current, with the result that the apparatus of the invention is further fitted for AC constant current feeding.

What is claimed is:

1. A power control or conversion apparatus comprising:

a controlled rectifier element;

an inductor having one end connected to one end of said controlled rectifier element;

a first rectifier element having one end connected to the other end of said controlled rectifier element in reverse series combination;

reverse bias means connected between the one end of said controlled rectifier element and the other end of said rectifier element for applying a reverse bias voltage pulse to said controlled rectifier element though said rectifier element for turning off said controlled rectifier element;

switching means connected between the other end of said inductor and the other end of said rectifier element through a DC power source;

an output terminal connected to both the other end of said controlled rectifier element and the one end of said rectifier element; and a second rectifier element connected between the other end of said inductor and the other end of said controlled rectifier element;

said switching means being cut off in synchronism with the turning-off of said controlled rectifier element, and said reverse biasing means applying said reverse bias voltage pulse to said controlled rectifier element during the cut-off state of said switching means.

2. A power control or conversion apparatus comprising:

a first circuit including at least a pair of controlled rectifier elements connected in series forming a first junction in the forward direction to each other;

a second circuit consisting of at least a pair of rectifier elements connected in series forming a second junction in the forward direction to each other;

a first inductor connected between the anode end of said first circuit and the cathode end of said second circuit;

a second inductor connected between the cathode end of said first circuit and the anode end of said second circuit;

a third circuit including a switching means, said switching means consisting of a solid state switch, and including a DC power source connected in series in the forward direction to said switching means;

said third circuit connected between the cathode end of said second circuit and the anode end of said second circuit;

an output terminal connected to both of the first junction of said first circuit and the second circuit; and reverse biasing means connected between at least one terminal-pair of the following three terminal-pairs
 (a) the terminal-pair of the anode end and cathode end of said first circuit,
 (b) the terminal-pair of the anode end of said first circuit and anode end of said second circuit,
 (c) the terminal-pair of the cathode end of said first circuit and cathode end of said second circuit;

said switch being cut off in synchronism with a turning off of said controlled rectifier elements, said reverse biasing means applying a reverse bias voltage pulse to said controlled rectifier elements for turning-off said controlled rectifier elements during the cut-off state of said switching means.

3. A power control or conversion apparatus according to claim 2, wherein:

said reverse biasing means includes a commutation capacitor.

4. A power control or conversion apparatus according to claim 3, wherein:

said reverse biasing means comprises a series circuit including a commutation capacitor and a reactor.

5. A power control or conversion apparatus according to claim 3, wherein:
said reverse biasing means includes a commutation capacitor and an auxiliary solid state switch.

6. A power control or conversion apparatus according to claim 2, wherein:
said reverse biasing means includes an auxiliary solid state switch and an auxiliary power source.

7. A power control or conversion apparatus according to claim 2 wherein:
said first circuit consists of a plurality of said pair of controlled rectifier elements for forming the bridge connected controlled-rectifier circuit, and a plurality of first junctions each connected to the plurality of said output terminals;
said second circuit consists of the plurality of said pair of said rectifier elements for forming the bridge connected rectifier circuit, and a plurality of second junctions each connected to the plurality of said output terminals.

8. A power control or conversion apparatus according to claim 2, wherein said solid state switch includes a controlled rectifier component and said reverse biasing means includes a commutation capacitor and an auxiliary solid state switch, said commutation capacitor also reversely biasing said controlled rectifier element of said switching means.

9. A power control or conversion apparatus according to claim 7 including:
control means for controlling a quantity of AC power supplied to said output terminals by controlling a conduction time ratio of either of said switching means and said controlled rectifier elements.

10. A power control or conversion apparatus according to claim 9, wherein:
said control means includes a current detecting means for detecting a current in at least one of said first inductor and said second inductor,
said conduction time ratio being controlled in response to the output from said detecting means.

11. A power control or conversion apparatus according to claim 9, wherein:
said control means includes an AC output detecting means for detecting a quantity of the AC output power supplied to said output terminals, said conduction time ratio being controlled in response to the output from said AC output detecting means.

12. A power control or conversion apparatus according to claim 9, wherein:
said first inductor and said second inductor are magnetically coupled to each other.

13. A power conversion apparatus according to claim 7, wherein further comprising:
a rotary electric machine having multi-phases of AC windings connected to said plurality of said output terminals connecting to an AC load.

14. A power conversion apparatus according to claim 13, wherein:
said multi-phase AC windings being disposed on a stator of said rotary electric machine and said rotary electric machine further having an electromagnetic rotor to be rotated in a rotating magnetic field which is provided by said multi-phase AC windings and further having a second multiphase AC winding being disposed on said stator for connecting to said AC load.

15. A power conversion apparatus according to claim 13 wherein:
said rotary electric machine further has a squirrel cage of conductors disposed on a rotor of said rotary electric machine.

* * * * *